US011279552B2

(12) United States Patent
Heitke et al.

(10) Patent No.: US 11,279,552 B2
(45) Date of Patent: Mar. 22, 2022

(54) SHAPEABLE FOOD SEASONING

(71) Applicant: General Mills, Inc., Minneapolis, MN (US)

(72) Inventors: Benjamin Lee Heitke, Corcoran, MN (US); Christopher J. Barrett, Minneapolis, MN (US); Goeran Walther, Plymouth, MN (US); Kenneth L. Palmer, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 1017 days.

(21) Appl. No.: 14/908,849

(22) PCT Filed: Mar. 7, 2014

(86) PCT No.: PCT/US2014/021505
§ 371 (c)(1),
(2) Date: Jan. 29, 2016

(87) PCT Pub. No.: WO2014/149913
PCT Pub. Date: Sep. 25, 2014

(65) Prior Publication Data
US 2016/0183572 A1 Jun. 30, 2016

Related U.S. Application Data

(60) Provisional application No. 61/789,392, filed on Mar. 15, 2013.

(51) Int. Cl.
*B65D 85/00* (2006.01)
*B65B 25/22* (2006.01)
(Continued)

(52) U.S. Cl.
CPC ............ *B65D 85/70* (2013.01); *A23L 27/105* (2016.08); *A23L 27/14* (2016.08); *A23L 27/206* (2016.08);
(Continued)

(58) Field of Classification Search
None
See application file for complete search history.

(56) References Cited

U.S. PATENT DOCUMENTS 3,423,212 A * 1/1969 Purcell ................. B65B 25/067
426/415
4,746,525 A 5/1988 Goto et al.
(Continued)

FOREIGN PATENT DOCUMENTS

EP 0981970 A1 3/2000
EP 2217097 B1 8/2010
(Continued)

OTHER PUBLICATIONS

Fox, "Fox Packaging: Products", Oct. 7, 2011. [Retrieved on Apr. 29, 2019], Retrieved from Internet URL <https://web.archive.org/web/20111007042540/http://www.foxbag.com/products/>. (Year: 2011).*
(Continued)

*Primary Examiner* — Stephanie A Cox
(74) *Attorney, Agent, or Firm* — Diederiks & Whitelaw, PLC; John L. Crimmins, Esq.

(57) ABSTRACT

A food kit may include a food item, a shaped food seasoning product, and a container. In some examples, the shaped food seasoning product defines a three-dimensional shape and includes a binder material binding the shaped food seasoning product together to define the three-dimensional shape and seasoning. The seasoning may form greater than 20 weight percent of the shaped food seasoning product. The
(Continued)

container may enclose the food item and the shaped food seasoning product so that the food item and the shaped food seasoning product are contained inside the container. During use, a consumer may transfer the contents of the food kit to a cooking container and add liquid to the container, causing the shaped food seasoning product to dissolve and release the seasoning bound in the seasoning product.

22 Claims, 4 Drawing Sheets

(51) Int. Cl.
*B65B 3/08* (2006.01)
*B65B 57/14* (2006.01)
*B65B 3/10* (2006.01)
*B65B 29/08* (2006.01)
*A23L 27/00* (2016.01)
*A23L 27/26* (2016.01)
*A23L 27/10* (2016.01)
*A23L 27/40* (2016.01)
*A23L 27/20* (2016.01)
*A23L 27/14* (2016.01)

(52) U.S. Cl.
CPC .............. *A23L 27/26* (2016.08); *A23L 27/40* (2016.08); *A23L 27/70* (2016.08); *B65B 3/08* (2013.01); *B65B 3/10* (2013.01); *B65B 25/22* (2013.01); *B65B 29/08* (2013.01); *B65B 57/145* (2013.01); *A23V 2002/00* (2013.01); *B65B 2220/14* (2013.01)

(56) References Cited

U.S. PATENT DOCUMENTS

| | | | | |
|---|---|---|---|---|
| 4,762,056 A * | 8/1988 | Virag | ...................... | A47J 27/00 |
| | | | | 426/394 |
| 4,803,088 A * | 2/1989 | Yamamoto | ......... | B65D 81/3453 |
| | | | | 426/107 |
| 5,063,072 A | 11/1991 | Gillmore et al. | | |
| 5,077,066 A * | 12/1991 | Mattson | .................. | B65B 29/08 |
| | | | | 426/107 |
| 7,186,961 B2 * | 3/2007 | Ozawa | .................. | A47J 36/027 |
| | | | | 219/725 |
| 2002/0168453 A1 | 11/2002 | McCutchan | | |
| 2007/0237867 A1 * | 10/2007 | Kratochvil | ........... | B65D 77/003 |
| | | | | 426/232 |
| 2008/0166459 A1 * | 7/2008 | Achterkamp | ........... | A23L 27/14 |
| | | | | 426/249 |

FOREIGN PATENT DOCUMENTS

| | | |
|---|---|---|
| WO | 2002069742 A1 | 9/2002 |
| WO | 2004112513 A1 | 12/2004 |
| WO | 2009074442 A1 | 6/2009 |

OTHER PUBLICATIONS

International Patent Application No. PCT/US2014/021505, International Search Report and Written Opinion dated Jun. 12, 2014, 9 pages.

* cited by examiner

SHAPEABLE FOOD SEASONING

RELATED APPLICATIONS

This application is a 35 U.S.C. 371 national stage filing from International Application No. PCT/US2014/021505, filed Mar. 7, 2014, which claims priority to U.S. Application No. 61/789,392, filed Mar. 15, 2013. The entire contents of both these references are incorporated herein by reference.

TECHNICAL FIELD

This disclosure relates to food products and, more particularly, to food seasoning products.

BACKGROUND

Commercially processed and packaged foods have found widespread acceptance among the consuming public. These commercially processed and packaged foods include frozen ready-to-eat meals and boxed shelf-stable meal kits, to name a couple of examples. Typically these types of food products include some or all of the ingredients required to make a complete meal. For example, the food products may include pasta noodles, rice, vegetables, or the like that can be cooked together to provide a complete meal. Oftentimes, the food product may require that the consumer add cooked meat, milk, water, or a limited number of other ingredients to the food product during the cooking process to prepare the meal. Regardless, these types of food products are generally designed to be easy to prepare and require minimal preparation time on the part of the consumer.

Prepackaged meal kits frequently contain a seasoning to enhance the taste, flavor, texture, or other properties of the meal. The seasoning may be dispersed among the other components of the meal or, alternatively, segregated from the other components of the meal. When the seasoning is segregated, the meal kit usually provides instructions for the user to combine the seasoning with the other meal components at a specific point during the preparation process.

To keep seasoning in a prepackaged meal kit fresh and shelf-stable over the intended shelf-life of the meal kit, the seasoning may be packaged in a special package that helps prevent the seasoning from being exposed to oxygen and moisture. For example, the seasoning may be supplied in a package that includes a metal foil layer or advanced polymeric barrier layer to prevent ingress of oxygen and moisture. This is because food seasonings are generally hygroscopic, attracting and absorbing moisture that can reduce the shelf-life of the seasoning. While special packaging can extend the shelf-life of a seasoning, such packaging is often expensive and requires additional processing complexity to separately package the seasoning from the other food components in the meal kit.

SUMMARY

In general, this disclosure is directed to a food seasoning product that contains seasoning bound together with an edible binder and formed and compacted into a three-dimensional shape. The food seasoning product may disintegrate upon exposure to liquid water, for example during a cooking process, causing the food seasoning product to lose its three-dimensional shape. In contrast to granular, particulate, or ""loose"" powder seasoning that provides significant surface area for absorbing water and oxidizing, seasoning held together with a binder may define a seasoning structure and shape where seasoning inside of the structure is protected from ambient moisture and oxygen. As a result, the seasoning structure may extend the shelf-life of the seasoning as compared to when the seasoning is provided in granular, unbound form. Depending on the application, the food seasoning product may be packaged directly in a kit with another food item without first placing the seasoning in special seasoning package that is then added to the kit. In use, a consumer may transfer the contents of the kit in a skillet, add water to the skillet to dissolve the seasoning product and form a seasoning sauce, and cook the food item in the seasoning sauce.

In some examples, and without being bound by any particular theory, the food seasoning product may exhibit lower water activity and increased shelf-life at a given level of moisture than the corresponding seasoning incorporated into the food seasoning product by undergoing a crystalline structure change (e.g., from a crystalline structure to an amorphous structure) during processing. For example, before being incorporated into the food seasoning product, at least a portion of the seasoning may exhibit a crystalline structure. During processing in which the seasoning is mixed and combined with a binder and hydrated and formed into a three-dimensional shape, the seasoning may undergo a structural change in which the crystalline structure is converted into a non-crystalline, amorphous structure. This structural transformation may alter the water and/or oxygen absorption characteristics of the seasoning and, consequently, increase the shelf-life of the seasoning. In other examples, however, the seasoning may not undergo a crystalline structure transformation when being processed into the food seasoning product.

In one example, a food kit is described that includes a shaped food seasoning product that defines a three-dimensional shape and a container. According to the example, the shaped food seasoning product includes a binder material binding the shaped food seasoning product together to define the three-dimensional shape and seasoning, and the seasoning comprises greater than 20 weight percent of the shaped food seasoning product. The example also specifies that the container encloses the food item and that the container exhibits a water vapor transfer rate of greater than 0.05 grams/100 square inches/day.

In another example, a method is described that includes mixing a binder material configured to hold a shaped food seasoning product together to define a three-dimensional shape and seasoning to form an extrudable food seasoning composition. In the example, the seasoning forms greater than 20 weight percent of the extrudable food seasoning composition. The example method further includes extruding the extrudable food seasoning composition to form a shaped food seasoning product defining the three-dimensional shape, and packaging the shaped food seasoning product with a food item in a container so that the food item is in contact with the shaped food seasoning product inside the container.

In another example, a method is described that includes opening a container that includes a food item and a shaped food seasoning product that is in contact with the shaped food seasoning product inside of the container. According to the example, the shaped food seasoning product includes a binder material binding the shaped food seasoning product together to define a three-dimensional shape and seasoning, and the seasoning forms greater than 20 weight percent of the shaped food seasoning product. The example method further includes adding water to the food item and the shaped food seasoning product and thereby disintegrating the shaped food seasoning product.

In another example, a method is described that includes combining a binder material configured to hold a shaped food seasoning product together to define a three-dimensional shape with seasoning and water to produce an extrudable food seasoning composition, wherein seasoning comprises greater than 20 weight percent of the extrudable food seasoning composition and at least a portion of the extrudable food seasoning composition defines a crystalline structure; extruding the extrudable food seasoning composition into the three-dimensional shape to produce an extruded food seasoning product, wherein extruding the extrudable food seasoning composition comprises converting the crystalline structure into an amorphous structure; and drying the extruded food seasoning product.

In one aspect according to this above example, the extrudable food seasoning composition comprises greater than 5 weight percent water. In another aspect according to the above example, the extrudable food seasoning composition comprises from approximately 7 weight percent water to approximately 25 weight percent water, and drying the extruded food seasoning product comprises drying the extruded food seasoning product so that extruded food seasoning product comprises less than approximately 7 weight percent water. In another aspect according to the above example, extruding the extrudable food seasoning composition comprises cold extruding the extrudable food seasoning composition so that the extrudable food seasoning composition does not exceed a temperature of approximately 150 degrees Fahrenheit during extrusion. In another aspect according to the above example, extruding the extrudable food seasoning composition comprises inputting from approximately 25 Watt-hours/kilogram to approximately 250 Watt-hours/kilogram of mechanical energy into the extrudable food seasoning composition. In another aspect according to the above example, the binder material comprises at least one of a flour, a protein, a hydrocolloid, and a gum.

In another aspect according to the above example, the method further comprises combining a filler material with the binder material, the seasoning, and the water to produce the extrudable food seasoning composition, wherein the filler material is configured to cause the extruded food seasoning product to disintegrate and loose the three-dimensional shape upon exposure to water. For instance, the filler material may comprise at least one of an uncooked, ungelatinized starch, a flour, a plant fiber, and an inorganic filler. In another aspect according to the above example, the seasoning comprises at least one of an herb, a spice, a sweetener, a dairy-based flavoring, a meat-based flavoring, and a vegetable-based flavoring. For instance, the seasoning comprises at least one of garlic, onion, ginger, chili powder, oregano, sage, dill weed, basil, fennel, mustard seed, lemon powder, nutmeg, cumin, rosemary, thyme, parsley, paprika, salt, sugar, pepper, dried vegetable particulate, cheese flavoring, sour cream flavoring, mushroom flavoring, tomato flavoring, beef flavoring, and chicken flavoring.

In another aspect according to the above example, the extrudable food seasoning composition comprises from approximately 5 weight percent to approximately 25 weight percent binder, from approximately 40 weight percent to approximately 95 weight percent seasoning, and from approximately 7 weight percent to approximately 25 weight percent water; and extruding the extrudable food seasoning composition comprises cold extruding the extrudable food seasoning composition so that the extrudable food seasoning composition does not exceed a temperature of approximately 150 degrees Fahrenheit during extrusion.

In another example, a food seasoning product is described that includes a binder material configured to bind the food seasoning product together to define a three-dimensional shape, a seasoning comprising greater than 20 weight percent of the food seasoning product, and water comprising less than 10 weight percent of the food seasoning product. The example specifies that the food seasoning product defines a non-crystalline structure having the three-dimensional shape, and the food seasoning product is configured to disintegrate when exposed to liquid water.

In one aspect according to this above example, the water comprises from approximately 3 weight percent to approximately 8 weight percent of the food seasoning product. In another aspect according to the above example, wherein the binder material comprises at least one of a flour, a protein, a hydrocolloid, and a gum. In another aspect according to the above example, the food seasoning product further comprises a filler material configured to cause the extruded food seasoning product to disintegrate and loose the three-dimensional shape upon exposure to water. For instance, the binder material may comprise from approximately 5 weight percent to approximately 25 weight percent of the food seasoning product, filler may comprise from approximately 15 weight percent to approximately 35 weight percent of the food seasoning product, and seasoning may comprise from approximately 40 weight percent to approximately 80 weight percent of the food seasoning product.

In another aspect according to the above example, the seasoning comprises at least one of an herb, a spice, a sweetener, a dairy-based flavoring, a meat-based flavoring, and a vegetable-based flavoring. In another aspect according to the above example, the three-dimensional shape comprises at least one of a sphere, a cylinder, a disk, and a noodle shape.

In another example, a food seasoning product is described that includes a binder material, seasoning, and water. According to the example, the food seasoning product is formed by a process that includes combining the binder material, seasoning, and water to form an extrudable food seasoning composition, the extrudable food seasoning composition comprising greater than 20 weight percent seasoning, extruding the extrudable food seasoning composition into a three-dimensional shape so as to produce an extruded food seasoning product having a non-crystalline structure, and drying the extruded food seasoning product.

In one aspect according to this above example, drying the extruded food seasoning product comprises drying the extruded food seasoning product until the extruded food seasoning product comprises from approximately 3 weight percent to approximately 8 weight percent water. In another aspect according to the above example, the food seasoning product further comprises a filler material configured to cause the extruded food seasoning product to disintegrate and loose the three-dimensional shape upon exposure to water. For instance, the filler may comprise an uncooked, ungelatinized starch.

In another aspect according to the above example, extruding the extrudable food seasoning composition comprises cold extruding the extrudable food seasoning composition so that the uncooked, ungelatinized starch does not cook and gelatinize during extrusion. In another aspect according to the above example, the extruded food seasoning product comprises from approximately 5 weight percent to approximately 25 weight percent binder material, from approximately 15 weight percent to approximately 35 weight filler material, from approximately 40 weight percent to approximately 80 weight percent seasoning, and from approximately 3 weight percent to approximately 10 weight percent water. In another aspect according to the above example, the binder material defines a continuous phase and the filler material defines a discontinuous phase dispersed through the continuous phase.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples and do not limit the scope of the disclosure. The drawings are not to scale (unless so stated) and are intended for use in conjunction with the explanations in the following detailed description. Examples of the present disclosure will hereinafter be described in conjunction with the appended drawings, wherein like numerals denote like elements.

DETAILED DESCRIPTION

In general, this disclosure relates to a food seasoning product that contains edible seasoning compacted and bound together in a three-dimensional structure. Example three-dimensional structures include spheres, disks, cylinders, pyramids, and annuluses, to name a few examples. The three-dimensional structure may disintegrate during a cooking process to release the seasoning bound in the structure. For example, the seasoning product may disintegrate when the product is exposed to a liquid (e.g., water), heat, and/or agitation. While the dry seasoning product may disintegrate during a cooking process when combined with water, the seasoning product may nevertheless be strong enough to withstand being packaged and transported without breaking down, e.g., into a powder lacking a macro three-dimensional shape. By controlling the constituent components and formation of the food seasoning product, the product may provide an easier to use and more shelf stable seasoning product than a powder seasoning product typically distributed to consumers.

Figure 1:
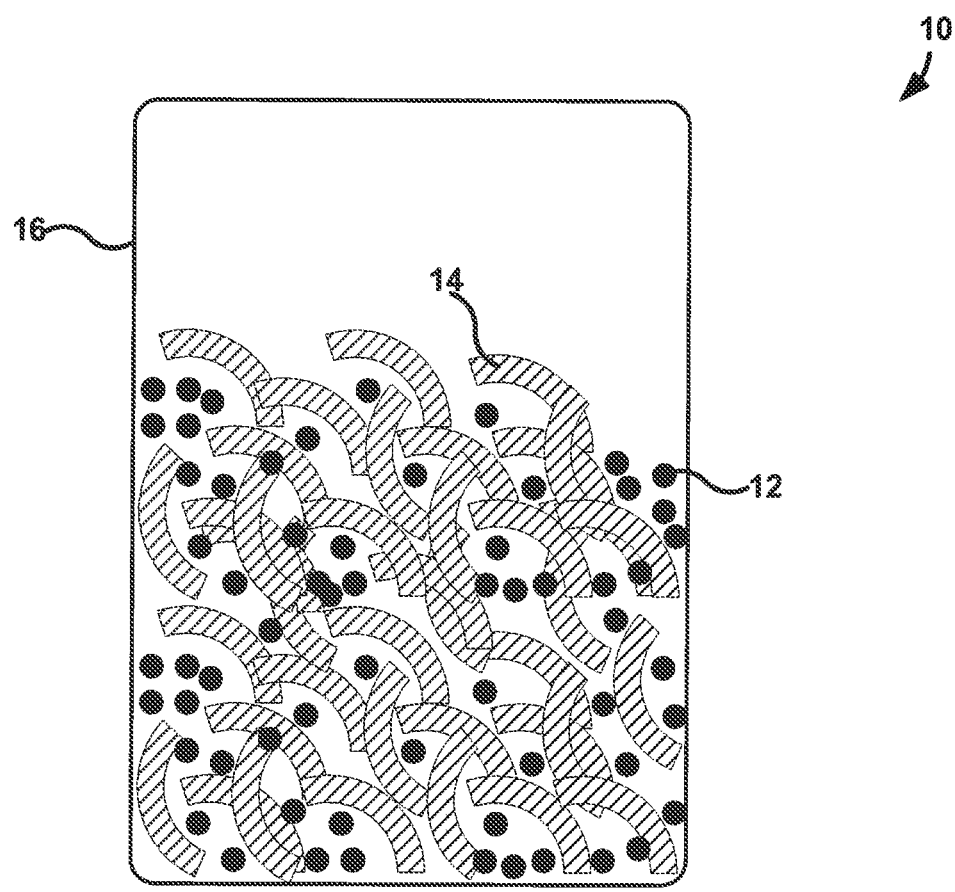
FIG. 1 is a perspective view of an example food kit that includes an example food seasoning product.

FIG. 1 is a perspective view of an example food kit 10 that may include a food seasoning product in accordance with the disclosure. In the example, food kit 10 includes a food seasoning product 12 (referred to herein as "seasoning product 12"), a food item 14, and a package 16 (also referred to herein as container 16). Seasoning product 12 contains edible seasoning that is used to modify the taste of food item 14 during preparation. As described in greater detail below, seasoning product 12 may contain powdered seasoning held together with a binder to form a plurality of discrete seasoning particles defining three-dimensional shapes. In general, food item 14 is one or more pieces of food that are suitable for human or other mammalian consumption and that are intended to be seasoned with the seasoning bound within seasoning product 12. Package 16 is a structure that contains and encloses seasoning product 12 and food item 14.

Food kit 10 may form a ready-to-eat meal kit that can be stored in a freezer, in a refrigerator, or on a shelf at ambient temperature, depending on the type of food item 14 contained within the kit. Example foods that may be included as food item 14 include pasta, rice, vegetables (e.g., potatoes, carrots, beets, broccoli), fruits (e.g., apples, pears, blueberries, raspberries), meats (e.g., chicken, pork, beef, fish), and the like. In one example, food kit 10 contains dried pasta noodles as food item 14. Any suitable dried pasta may be included in food kit 10 in accordance with this example including bowtie noodles, spaghetti noodles, ziti noodles, rigatoni noodles, linguine noodles, fettuccine noodles, vermicelli noodles, macaroni noodles, lasagna noodles, penne noodles, tagliatella noodles, and manicotti noodles. In some applications, food kit 10 contains food items that do not need to be refrigerated or frozen before use so that the food kit can be stored at ambient temperature before use. In other examples, food kit 10 may contain a food item that should be refrigerated or frozen before use.

In the example of FIG. 1, seasoning product 12 and food item 14 are contained within a common package 16 so that the seasoning product and food item are in direct contact with one another within the package. That is, the surfaces of seasoning product 12 and food item 14 may physically contact one another inside of package 16. During use, a consumer may open package 16 and transfer the contents of the package, including seasoning product 12 and food item 14, to a cooking container. In some examples, the consumer also adds a liquid ingredient (e.g., water, milk, oil) and/or a perishable ingredient (e.g., fresh vegetable, fresh meat) to the cooking container to supplement the ingredients provided by food kit 10. Regardless, seasoning product 12 may break down within the cooking container, releasing seasoning that distributes over the external surfaces of food item 14 upon mixing. For example, seasoning product 12 may disintegrate upon contact with a liquid ingredient (e.g., water) and/or application of heat to the seasoning product within the cooking container. Seasoning product 12 may disintegrate by breaking down, dispersing, suspending, dissolving, and/or decomposing into its constituent elements, e.g., so that seasonings bound and compacted within the product returns to its unbound state.

As described in greater detail below, seasoning product 12 produced in accordance with the disclosure may be more shelf stable than the constituent ingredients of the product (e.g., powdered seasonings), were the constituent ingredients placed in package 16 instead of the seasoning product. For example, seasoning product 12 may absorb more moisture at a given level of water activity and related shelf stability than the constituent ingredients of the product can absorb at the same level of water activity and related shelf stability (for example, were the constituent ingredients not processed into seasoning product 12). Because seasoning product 12 can exhibit an enhanced shelf life as compared to the constituent ingredients of the product, the seasoning product may be packaged differently than the constituent ingredients of the product would normally be packaged.

One way to characterize food packaging is by the permeability of a package, such as moisture permeability and oxygen permeability. A package that is more moisture and oxygen permeable will allow a food product in the package to absorb more moisture and be exposed to more oxygen, and hence become stale and oxidized, faster than a package that is comparatively less moisture permeable. One of the lowest moisture permeability packages typically used in the food industry is a metalized foil package, which is usually formed of one or more polymer film layers coated with a thin layer of metal such as aluminum. Depending on the specific design, such a package can exhibit a water vapor transfer rate of less than or equal to 0.03 grams (of moisture) per 100 square inches (645.2 square centimeters) of package per day. By contrast, a package formed of one or more layers of high-density polyethylene without a foil or metallized layer may exhibit a water vapor transfer rate of approximately 0.12 grams per 100 square inches per day, and a package formed of one or more layers of oriented polypropylene (OPP) without a foil or metallized layer may exhibit a water vapor transfer rate of approximately 0.26 grams per 100 square inches per day. Similarly, a package that exhibits a comparatively high oxygen permeability may provide an oxygen (and/or air) transfer rate of greater than 50 cubic centimeters (cc) per 100 square inches of package per day, such as greater than or equal to 75 cc per 100 square inches per day. By contrast, a comparatively low oxygen permeability package may provide an oxygen (and/or air) transfer rate of less than 20 cc per 100 square inches per day, such as less than 10 cc per 100 square inches per day, or less than or equal to 6 cc per 100 square inches per day.

Oftentimes, seasoning products are packaged in containers with low water vapor transfer rates and low oxygen permeability, such as less than 0.05 grams water vapor per 100 square inches per day and less than 100 cubic centimeters oxygen per 100 square inches per day, to keep the seasoning suitably shelf stable. Because of the cost of these more specialized packages, when seasoning is also sold with another food item as part of a meal kit, the seasoning may be packaged separately in a small, specialized container while the other food item is packaged in a less expensive container that is more moisture permeable. In accordance with examples of the present disclosure, however, seasoning product 12 may be packaged directly with food item 14 without requiring a special, low moisture permeability package for the seasoning. For example, seasoning product 12 may be packaged with food item 14 in a container 16 that exhibits a water vapor transfer rate of greater than 0.05 grams per 100 square inches per day such as, e.g., greater than 0.1 grams per 100 square inches per day, greater than 0.2 grams per 100 square inches per day, or greater than 0.5 grams per 100 square inches per day. In these examples, the oxygen permeability of the package may or may not be greater than 5 cc per 100 square inches per day, such as greater than 50 cc per 100 square inches per day, or greater than 75 cc per 100 square inches per day.

In one example, package 16 is formed of high density polyethylene and does not include a metallized layer. In another example, package 16 is formed of oriented polypropylene and does not include a metallized layer. Other configurations of package 16 are both possible and contemplated. In addition, depending on the design, package 16 may or may not hermetically seal the contents inside of the package.

Further, although seasoning product 12 and food item 14 are illustrated in the example of FIG. 1 as being packaged together in package 16, in other examples, seasoning product 12 is packaged in a different package than food item 14. For example, seasoning product 12 may be packaged in package 16 without any other food items. A package used in this application may be a comparatively low water permeability package (e.g., a water vapor transfer rate of lower than 0.05 grams per 100 square inches per day) or a comparatively high water permeability package (e.g., a water vapor transfer rate of greater than 0.05 grams per 100 square inches per day).

During use, a consumer can open package 16 to access seasoning product 12 and, depending on the contents of the package, food item 14. The consumer may then add water or a liquid that includes water to seasoning product 12, causing the product to decompose into its constituent components. Once decomposed, seasoning bound within seasoning product 12 may dissolve and/or suspend in the water added to the product and/or become viscous and flowable so as to coat and season food item 14. The amount of water added to seasoning product 12 to cause the product to breakdown and disintegrate may vary depending on the chemical composition of the product.

In general, a consumer will add an amount of liquid (e.g., water) to seasoning product 12 effective to cause the product to disintegrate and lose its macro three-dimensional shape. When seasoning product 12 is packaged with food item 14, for example, the consumer may add from approximately 12 volume parts to approximately 17 volume parts liquid per volume part of packaging contents (e.g., combined volume of seasoning product and food item).

In some examples, seasoning product 12 is also heated during preparation to help cause the product to disintegrate. When heated, the seasoning product 12 may be heated to any suitable temperature including to a temperature greater than 50 degrees Celsius (122 degrees Fahrenheit), such as a temperature greater than 75 degrees Celsius (167 degrees Fahrenheit) or greater than 100 degrees Celsius (212 degrees Fahrenheit). In some additional examples, a consumer may also physically mix seasoning product 12 with food item 14 in a cooking container, for example, to impart mechanical force to help breakdown the seasoning product and to distribute seasoning over the food item. By providing seasoning product 12 and food item 14 together, food kit 10 may provide a simple, easy to prepare meal desired by many consumers.

In general, seasoning product 12 contains one or more food seasonings adhered together with a binder to provide a food seasoning pellet having a three-dimensional shape. The food seasonings may function to modify the flavor, and hence taste, of food item 14 when combined with the food item. The binder holds the food seasonings together to define a seasoning structure that is larger than any of the individual components incorporated into the seasoning. The binder may be strong enough to bind the food seasonings together so that seasoning product 12 does not break down during packaging, transport, and storage of the seasoning product in food kit 10. However, when seasoning product 12 is combined with food item 14 during preparation of food kit 10, the binder may be configured to release the bound food seasonings so that the seasonings can disperse on and around the food item. For example, the binder may hydrate when exposed to liquid water during preparation of food kit 10, causing the binder to dissolve and release the food seasonings held together by the binder. Depending on the application, and as described in greater detail below, seasoning product 12 may also include a filler material. The filler material may function to help seasoning product 12 break down and disintegrate during the cooking process, releasing the food seasonings held together in the food seasoning product. Seasoning product 12 can include additional or different components, as described herein.

Seasoning product 12 may include any edible seasonings, and the types of seasonings included in the product will vary depending, e.g., on the characteristics of food item 14 that is to be seasoned. Seasonings included in seasoning product 12 may be considered components that modify the natural flavors of food item 14, e.g., by enhancing or minimizing the natural flavors of the food item or by imparting a new flavor to the food item. Example seasonings include, but are not limited to, herbs, spices, sweeteners, and flavorings. Flavorings may be ingredients or combinations of ingredients that impart a specific flavor to a food item rather than enhancing or modifying the natural flavors of the food item. For example, seasoning product 12 may include a dairy-based flavoring (e.g., a cheese flavor, a butter flavor, a sour cream flavor, a cream flavor), a meat-based flavoring (e.g., a beef flavor, a chicken flavor, a pork flavor such as a bacon flavor, a fish flavor), a vegetable-based flavoring (e.g., a broccoli flavor, a bell pepper flavor, a carrot flavor, a potato flavor, a mushroom flavor, a tomato flavor), and/or different types of flavorings (e.g., a smoke flavor, a grill flavor, a wine flavor, a fried flavor).

Example seasonings that may be included in seasoning product 12 include, but are not limited to: sugar (e.g., glucose, fructose, sucrose, maltose), salt (sodium chloride), celery (e.g., celery salt, ground celery), garlic (e.g., garlic salt, ground garlic bulbs or chives), onion (e.g., onion salt, ground onion), sour salt (e.g., crystals of citric acid), ginger (e.g., gingerroot), pepper (e.g., ground peppercorn), sassafras, coriander, fennel, fenugreek, mustard, turmeric, cardamom, red pepper, cayenne pepper (e.g., ground pods and seeds of red peppers of the genus *Capsicum*), chili powder, curry powder, paprika, cumin, oregano, sage, angelica, saffron, sesame, caraway, poppy, dill weed, basil, monosodium glutamate (MSG), allspice, cinnamon, clove, mace, nutmeg, dried fruit and/or vegetable particulate (e.g., dried and ground lemon, tomato powder, dried and ground carrots), rosemary, thyme, and parsley.

In some examples, seasoning incorporated into seasoning product 12 include hygroscopic seasonings that cannot be stored for extended periods of time without being in a low moisture permeability package. In accordance with these examples, seasoning components incorporated into seasoning product 12 may exclude (e.g., be substantially or entirely free of) less hygroscopic components such as, e.g., salt, sugar, and/or flour. When desired, these components (e.g., salt, sugar, and/or flour) may be added to package 16 without being bound in seasoning product 12 so that, when a consumer dispenses the contents of the package into a cooking container, the components also are added to the cooking container.

The amount of seasoning incorporated into seasoning product 12 may vary depending on the characteristics of the seasoning product (e.g., the compaction strength and disintegration characteristics of the seasoning product) and the types of seasonings incorporated into the product. In some examples, seasoning product 12 comprises greater than 5 weight percent seasoning such as, e.g., greater than 10 weight percent seasoning, greater than 20 weight percent seasoning, greater than 40 weight percent seasoning, greater than 50 weight percent seasoning, or greater than 75 weight percent seasoning. For example, seasoning may range from approximately 10 weight percent to approximately 95 weight percent of seasoning product 12 such as, e.g., from approximately 25 weight percent to approximately 90 weight percent of the seasoning product, from approximately 40 weight percent to approximately 85 weight percent of the seasoning product, from approximately 15 weight percent to approximately 75 weight percent of the seasoning product, or from approximately 30 weight percent to approximately 75 weight percent of the seasoning product. The weight of the seasoning in seasoning product 12 may be the combined weight of all the seasonings included in the product (in instances in which the seasoning product includes more than one type of seasoning).

Individual seasonings incorporated into seasoning product 12 may be incorporated as dry ingredients or wet ingredients. When an individual seasoning is incorporated into seasoning product 12 as a dry ingredient, the seasoning may be ground into a powder or particulate form, for example, defining a median particle size less than 1 millimeter (mm), such as less than 500 microns, or less than 250 microns, prior to being incorporated into seasoning product 12. In other examples, an individual ingredient may be incorporated into seasoning product 12 in wet form, for example, as an oil extract of a plant, or as a water, oil, or alcohol-based product.

Seasoning product 12 also includes a binder component that can bind the individual seasoning ingredients together to define a bulk seasoning structure larger in size than the size of any constituent components forming the seasoning product. The binder may be a water soluble polymer providing a network structure that entraps, encapsulates, and immobilizes the individual seasoning components to form seasoning product 12. When sufficiently hydrated, the water soluble polymer may bind the individual seasonings together to form seasoning product 12. After seasoning product 12 is formed, compacted, and dried, however, adding water to rehydrate the product may cause the product to disintegrate and lose structural rigidity.

The binder may be provided by a component or components that, when mixed with water, form a homogenous dough, gel, or paste that can be mixed with seasoning. Example components that may be incorporated into seasoning product 12 to function as a binder include starches, proteins, gums, hydrocolloids (native, hybrid, modified, and/or hydrolyzed), and other carbohydrate sources (e.g., celluloses, maltodextrins). In general, these components can be hydrated to form viscous gels or doughs, which can be mixed with seasoning ingredients, compacted and formed into a three-dimensional shape, and subsequently dried to form seasoning product 12. When combined with seasonings and dried, the viscous gels or doughs may define a rigid, three-dimensional seasoning product capable of disintegrating during a subsequent cooking process.

When a starch is used as a binder, the starch may be a pregelatinized starch, such as a cooked, pregelatinized starch. Starch can be pregelatinized by heating the starch in water, for example to a temperature above approximately 70 degrees Celsius (158 degrees Fahrenheit), causing starch granules to swell, burst, and lose their semi-crystalline structure. As the starch breaks down during this gelatinization process, the starch may release amylose and amylopectin molecules and form an aqueous starch network that can bind other components of the seasoning product together. Example starches that may be incorporated into seasoning product 12 to function as a binder include native and/or modified (e.g., mechanically, chemically, thermally, enzymatically, modified by high pressure) starches derived from sources that include, but are not limited to, corn, wheat, rice, millet, rye, barley, oats, cassava, potato, legumes, and tapioca.

In addition to or in lieu of incorporating starch into seasoning product 12 to bind seasoning ingredients together, the product may include a protein (e.g., protein concentrate, protein isolate) that functions as a binder component. Proteins derived or extracted from any suitable source can be used in seasoning product 12 including proteins from plant sources such as wheat, soy, corn, grains, seeds, nuts, and legumes; proteins from animal sources such as meats, eggs, and dairy products; and proteins from microorganisms such as a fungi, yeast, and bacteria. For example, protein that may be used as the binder can be derived or extracted from grain flours from sources that include, but are not limited to, corn, wheat, durum wheat, rice, barley, oat, and rye, and mixtures thereof. Example proteins from grain sources that can be used include gluten, vital wheat gluten, and zein. Example proteins from animal sources that can be used include gelatin, casein, whey, albumin and isomers and derivatives therefrom.

In addition to or in lieu of incorporating a starch or protein into seasoning product 12, the seasoning product may include a hydrocolloid (which may be a gum) that functions as a binder. Hydrocolloids typically are hydrophilic, organic polymers that form colloidal particles when combined with water. For example, hydrocolloids may dissolve, disperse or swell in water and, thus, modify the physical properties of an aqueous system in the form of gelation, thickening, emulsifying, stabilization, film-forming, or encapsulating. Example hydrocolloids that can be incorporated into seasoning product 12 include pectin, xanthan gum, gum arabic, gum ghatti, gum tragacanth, chicle gum, dammar gum, mastic gum, tara gum, spruce gum, psyllium seed husk, gellan gum, guar gum, locust bean gum, alginate, cellulose, agar, carrageenan, konjac gum, beta-glucan, and isomers and derivatives therefrom.

Independent of the specific type or types of binders used in seasoning product 12, the seasoning product may comprise any suitable amount of binder. In general, increasing the amount of binder used in seasoning product 12 may increase the binding and compaction strength and structural rigidity of the seasoning product 12. By contrast, if the amount of binder used in seasoning product 12 is reduced, the seasoning product may show a tendency to break, crack, or abrade when exposed to mechanical stress, e.g., as may be experienced during processing, drying, conveying, packaging, and shipping of the seasoning product. Accordingly, binder may be incorporated into seasoning product 12 in an amount effective to bind seasoning ingredients together and to cause the seasoning product to hold its three-dimensional shape during manufacturing, processing, packaging, transport, and storage while also allowing the seasoning product to disintegrate when exposed to water during a cooking process.

In some examples, seasoning product 12 includes greater than 5 weight percent binder such as, e.g., greater than 10 weight percent binder, greater than 15 weight percent binder, greater than 20 weight percent binder, or even greater than 35 weight percent binder. For example, binder may range from approximately 2 weight percent to approximately 60 weight percent of the seasoning product such as, e.g., from approximately 5 weight percent to approximately 40 weight percent, from approximately 5 weight percent to approximately 25 weight percent, from approximately 15 weight percent to approximately 35 weight percent, or from approximately 10 weight percent to approximately 30 weight percent. The weight of the binder in seasoning product 12 may be the combined weight of all the binders included in the product (in instances in which the seasoning product includes more than one type of binder).

After selecting a desired combination of seasoning(s) and binder(s), the constituent components can be combined together and processed to form seasoning product 12. As will be described in greater detail with respect to FIG. 2, the constituent components may be combined together with water to form a viscous paste or dough that is then shaped into a three-dimensional structure and dried, thereby forming seasoning product 12. During subsequent use, a consumer may rehydrate seasoning product 12 by adding a liquid (e.g., water) to the product, e.g., while heating and/or physically mixing the seasoning product in a cooking container, so as to cause the seasoning product to disintegrate and intermix with a food item to be seasoned.

To aid disintegration and breakdown of seasoning product 12 during use, the seasoning product may include a filler that is configured to help cause the seasoning product to disintegrate and loose its three-dimensional shape upon exposure to water. Depending on the composition of seasoning product 12, the seasoning product may or may not disintegrate during cooking even without the presence of the filler material. However, the filler material may accelerate the rate at which seasoning product 12 disintegrates as compared to when the seasoning product does not include the filler.

When used, the filler component may provide a discontinuous phase dispersed within a continuous phase provided by the binder. For example, the binder and filler may form a solid-solid and/or solid-liquid dispersion where the continuous phase comprises the components of seasoning product 12 that dissolve and/or homogenously disperse in water or another liquid solvent. The discontinuous phase in this example may comprise the components of seasoning product 12 that are insoluble and/or immiscible in water or another liquid solvent. Depending on the components used in seasoning product 12, for instance, the continuous phase may include any binder materials and seasonings incorporated into the seasoning product while the discontinuous phase may include the filler materials.

Incorporating a filler material into seasoning product 12 may affect the disintegration characteristics of the product by physically and/or chemically disrupting the continuous phase materials and decreasing cohesiveness within the product. For example, the filler material may form discontinuous phase particles that create tension and stress at the continuous phase/discontinuous phase interface within seasoning product 12 that may provide breakage points. The product may shear, break, and/or separate more easily at the interfaces between the continuous and discontinuous phases than at other locations within the seasoning product. As a result, a seasoning product with a filler material may disintegrate more easily than a comparable seasoning product that does not contain a filler material.

In examples in which seasoning product 12 includes a filler material, the filler material may be incorporated into the product in an amount effective to cause the product to disintegrate during cooking but which does not cause the product to disintegrate during handling and packaging prior to cooking (e.g., prior to being mixed with a liquid during cooking) As examples, seasoning product 12 may include greater than 5 weight percent filler such as, e.g., greater than 10 weight percent filler, greater than 15 weight percent filler, or greater than 25 weight percent filler. For example, filler may range from approximately 5 weight percent to approximately 65 weight percent of the seasoning product such as, e.g., from approximately 10 weight percent to approximately 50 weight percent of the seasoning product, or from approximately 15 weight percent to approximately 35 weight percent of the seasoning product. The weight of the filler in seasoning product 12 may be the combined weight of all the fillers included in the product (in instances in which the seasoning product includes more than one type of filler).

The types of components that can function as a filler in seasoning product 12 may depend on the components selected as the binder and/or seasoning that form the continuous phase. In general, a filler material may be selected as a material that is insoluble and/or immiscible in a liquid (e.g., water) in which the binder and/or seasoning components are soluble and/or miscible. For example, filler components in seasoning product 12 may be those components that cannot be hydrated to form a homogenous dough, gel, or paste. When so configured, the filler material may provide a dispersed phase that is embedded within and throughout a continuous phase defined by the binder and seasoning components, resulting in a seasoning product that exhibits heterogeneous solid-solid phase morphology. Example components that can be used as a filler include uncooked, ungelatinized starch, plant fiber, and inorganic filler.

In instances in which an uncooked, ungelatinized starch is used as a filler, the starch may be in granular, semi-crystalline form and may be native and/or modified (e.g., mechanically modified, chemically modified, thermally modified, enzymatically modified) starch. In general, starch is a polymer formed of linked anhydro-a-D-glucose units. It may have either a mainly linear structure (amylose) or a branched structure (amylopectin). The molecular weight of the constituent polymers, particularly amylose, varies between different starch sources. In native, uncooked and ungelatinized form, the starch molecules amylose and amylopectin are located within starch granules that are insoluble in cold water. Depending on the plant source, those water insoluble starch granules typically vary in size between 2 microns and 150 microns. Uncooked, ungelatinized starch granules can function as a filler or discontinuous phase in seasoning product 12. When used as a filler, starch may be derived from sources that include, but are not limited to, corn, wheat, rice, millet, rye, barley, oats, cassava, potato, legumes, and tapioca. When a plant fiber is used as a filler material, the plant fiber may be from any suitable source and may be insoluble in a liquid (e.g., water) in which the binder and seasoning components are soluble. Example inorganic fillers that may be used as a filler component in seasoning product 12 include clay, carbonates, and silicates.

In some examples, seasoning product 12 includes flour that functions as both a binder component and a filler component in the seasoning product. The flour may contain protein that functions as a binder in the seasoning product and ungelatinized starch that functions as a filler in the product. Accordingly, admixing flour with seasoning in accordance with these examples may yield a seasoning product that has both a continuous binder phase comprising the seasoning and protein from the flour and a discontinuous filler phase comprising the ungelatinized starch from the flour. Sources of flour that may be used in seasoning product 12 to provide both binder and filler include flours from grains such as wheat (e.g., hard wheat flour like semolina or durum flour and/or soft wheat flour like cookie flour), rye, rice, barley, oat, corn, and sorghum. In other examples, however, the relative amounts of binder and filler in seasoning product 12 may be adjusted compared to the amounts provided by flour alone.

In examples in which seasoning product 12 includes both a filler component and a binder component, the components can be incorporated into the seasoning product in amounts effective to cause the product to bind seasoning into a three-dimensional structure for packaging, storage, and distribution yet allow the structure to disintegrate during a cooking process. Depending on the chemical composition of the binder and filler components, seasoning product 12 may not readily dissolve or disintegrate when contacted with liquid during the cooking process if the product contains too much binder. Instead, the seasoning product may form a hard, glassy matrix that maintains its shape and structural integrity when exposed and cooked in a liquid such as water. By contrast, if seasoning product 12 contains too much filler, the seasoning product may lack sufficient cohesiveness to form a three-dimensional structure or may form a three-dimensional structure that easily disintegrates during packaging and transport prior a cooking process. Controlling the relative amounts of binder material and filler material incorporated into seasoning product 12 may be useful to provide a seasoning product that can disintegrate during a cooking process yet still be strong enough to withstand being packaged and transported without breaking down, e.g., into a powder lacking a macro three-dimensional shape.

Although the relative amounts of binder and filler can vary, in some examples, binder and filler are incorporated into seasoning product 12 in amounts effective to provide a ratio of a weight of filler divided by a weight of binder ranging from approximately 0.4 to approximately 7.5. For example, the ratio of the weight of filler divided by the weight of binder may range from approximately 0.8 to approximately 4 or from approximately 1.2 to approximately 3.5. The ratio may be determined by dividing the combined weight of all components functioning as a filler in seasoning product 12 by the combined weight of all components functioning as a binder in the seasoning product. In some examples, the ratio of filler to binder is greater than 1 so that seasoning product 12 contains more filler material than binder material. In other examples, however, seasoning product 12 contains less filler than binder or contains no filler at all, and it should be appreciated that the disclosure is not limited in this respect.

Seasoning product 12 can contain a variety of other components in addition to or in lieu of seasoning, binder, and/or filler, as will be appreciated by those of skill in the art. Example components that may be incorporated into seasoning product 12 include colorants, fragrances, preservatives to prevent bacterial growth and extend the shelf-life of the seasoning product, nutraceutical components to promote health or prevent disease or enhance well-being such as antioxidants, phytochemicals, hormones, vitamins such as Vitamin C and Vitamin E, pro-vitamins, minerals, microorganisms such as bacteria, fungi, and yeast, prebiotics, probiotics, trace elements, essential and/or highly unsaturated fatty acids such as omega-3 fatty acids, and mid-chain triglycerides, nutritional supplements, enzymes, pigments, oligopeptides, dipeptides, and amino acids. When used, each additional component may be added to seasoning product 12 in an amount effective to modify the properties (e.g., color, smell, nutritional content, microbial safety) of the seasoning product. In some examples, the seasoning, binder, and filler (when used) components of seasoning product 12 form greater than 50 weight percent of the product such as, e.g., greater than 70 weight percent of the product, greater than 80 weight percent of the product, or greater than 90 weight percent of the product.

Although seasoning product 12 can include a variety of components, the seasoning product may be substantially free of certain components that may prevent the seasoning product from dissolving in aqueous solvents (e.g., water) during a cooking process. For example, seasoning product 12 may be substantially or entirely free of water insoluble fats, fatty acids, and their derivatives (collectively "fat") including, e.g., oils (e.g., olive oil, palm oil, canola oil), lipids, esters of glycerol and one, two, or three fatty acids (e.g., triglycerides) and the like. In some examples, seasoning product 12 includes less than 25 weight percent fat such as, e.g., less than 10 weight percent fat, less than 5 weight percent fat, less than 3 weight percent fat, or approximately 0 weight percent fat.

While seasoning product 12 may be substantially or entirely free of fats in some examples, in other examples, the seasoning product may include some amount of fat (e.g., oil added for dust control and processing of the seasoning product). In one example, seasoning product 12 includes from approximately 0.1 weight percent to approximately 3 weight percent fat, such as approximately 1 weight percent fat.

After selecting a desired combination of components for seasoning product 12, the constituent components can be combined together and processed to form the seasoning product. In general, any suitable processes may be used to mix the constituent components together and to form the admixed components into a three-dimensional shape. In different examples, the constituent components may be mixed together and then agglomerated, tableted, compacted, compressed, prilled, pelletized, sintered, briquetted, or extruded to form a seasoning product having a macro three-dimensional shape and that is larger than any of the individual constituent components incorporated into the product.

Figure 2:
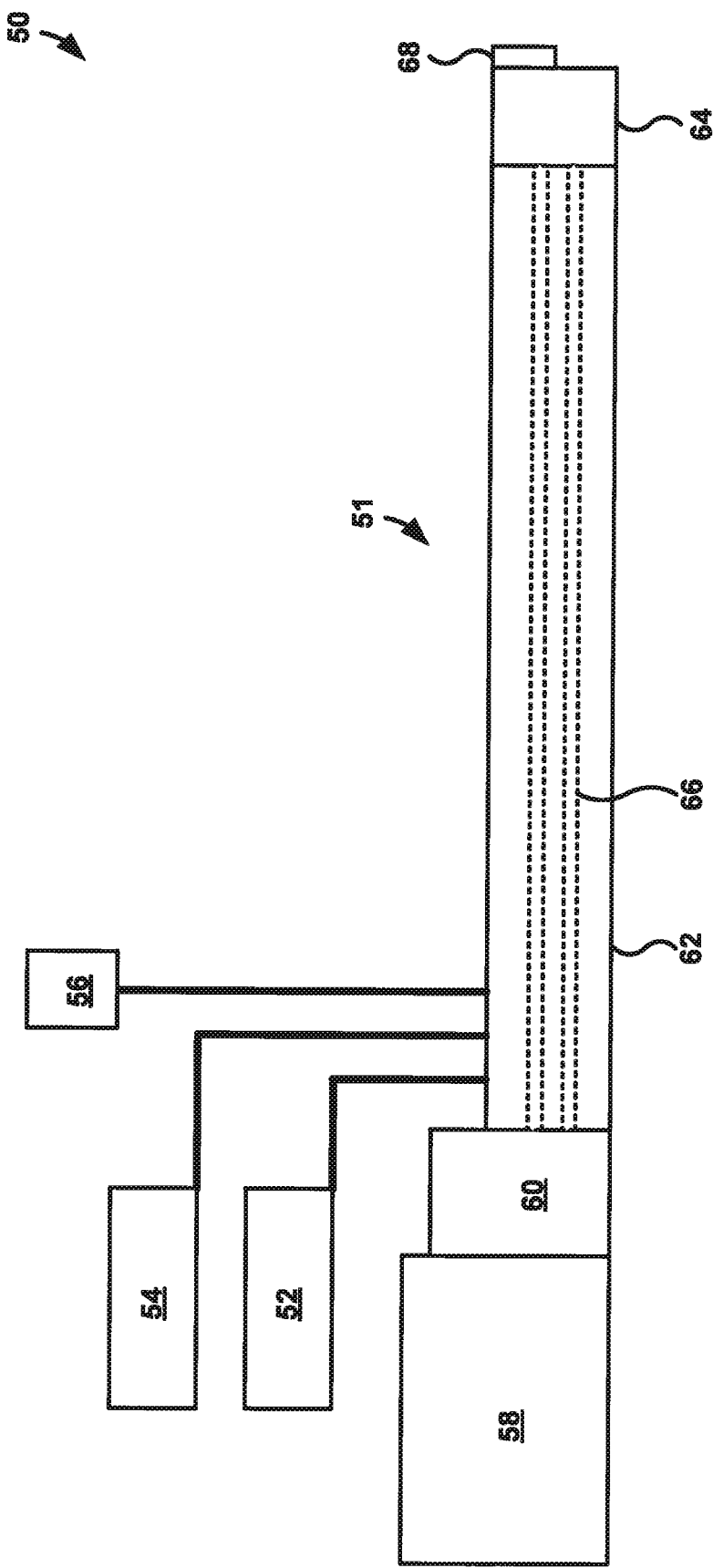
FIG. 2 is a functional block diagram illustrating example components of an extruder system that may be used to form the example food seasoning product of FIG. 1.

FIG. 2 is a functional block diagram illustrating example components of an extruder system 50 that may be used to process the constituent components of seasoning product 12 and to form the seasoning product into a three-dimensional shape. In the example of FIG. 2, extruder system 50 includes an extruder 51, a seasoning delivery apparatus 52, a binder delivery apparatus 54, and a liquid delivery apparatus 56. During operation, seasoning delivery apparatus 52 delivers seasoning ingredients to extruder 51, binder delivery apparatus 54 delivers binder ingredients to the extruder, and liquid delivery apparatus 56 delivers liquid ingredients and processing solvents to the extruder. Extruder 51 may receive dry and liquid ingredients, mix the ingredients together to form a dough, gel, or paste, and extrude the mixed ingredients through a die into a three dimensional shape. In applications where seasoning product 12 includes additional ingredients besides seasoning and binder, the additional ingredients (e.g., filler) may be mixed with the seasoning or binder and introduced to extruder 51 through the respective delivery apparatus. In other examples, extruder system 50 may not have separate delivery apparatuses for seasoning and binder but rather may have a single delivery apparatus that receives a mixture of seasoning and binder. In still other embodiments, all the constituent ingredients of seasoning product 12 can be mixed in a batch or continuous mixer to form a dough or paste that is then fed into extruder 51. Other ingredient delivery configurations are possible.

Extruder 51 can have a variety of different mechanical configurations. In the example of FIG. 2, however, extruder 51 includes a motor 58, a gear box 60, an extruder barrel 62, an extruder die 64, and a cutter 68. Extruder barrel 62, which may be formed of multiple barrel sections, contains at least one screw (e.g., single screw extruder) which, in the illustrated example, is shown as two screws 66 (e.g., twin screw extruder). During use, motor 58 rotationally drives screws 66 to generate a forwardly directed motion in the direction of extruder die 64. Screws 66 may mix, convey, and pressurize the constituent ingredients of seasoning product 12 as motor 58 rotates the screws and conveys the formed dough, gel, or paste toward the die, which provide an opening area restriction responsible for the pressure build-up. Extruder die 64 receives the pressurized and mixed ingredients forming seasoning product 12 and shapes the ingredients as the ingredients pass through a discharge aperture in the die, thereby forming a shaped, compacted extrudate. Cutter 68 is located downstream from extruder die 64 and can cut the shaped extrudate into discrete pieces of specific size (e.g., specific length).

In different examples, extruder 51 may be implemented as a single screw extruder or twin-screw extruder. When extruder 51 is implemented as a twin screw extruder that includes two screws 66, the two screws can be positioned tangentially to one another, non-intermeshing, or intermeshing (e.g., overlapping). Further, the two screws can be operated so the screws co-rotate (i.e., so each screw rotates in the same direction) or counter-rotate (i.e., so each screw rotates in a direction opposite from the other screw). Although an extruder having any suitable configuration can be used to produce seasoning product 12, in some examples, an extruder is used that has two intermeshing screws that co-rotate. Such a configuration may provide a self-cleaning extruder configuration that can thoroughly intermix the constituent components of seasoning product 12.

The specific operating parameters of extruder system 50 can vary, e.g., depending on the hardware configuration of extruder 51, the specific composition of the constituent components of seasoning product 12, and the desired properties of the finished seasoning product. In general, extruder 51 may be operated at a temperature and pressure that provides thorough intermixing between the constituent components introduced into the extruder but which does not elevate the temperature of the components to a temperature that damages, degenerates, or denatures the components.

In one example, seasoning product 12 is formed by introducing the constituent components of the seasoning product into extruder 51 and cold extruding the components into the three-dimensional shape of the seasoning product. During operation of extruder 51, friction and shear forces between rotating screws 66 and the ingredients within the extruder generates heat, causing the ingredients to increase in temperature. When seasoning product 12 includes protein and/or ungelatinized starch, elevated temperatures within extruder 51 can cause the protein to denature and/or the starch to gelatinize. If the protein in seasoning product 12 denatures and/or the ungelatinized starch gelatinizes, the seasoning product may not hold together for packaging and storage or may not fully disintegrate during subsequent use.

By cold extruding the constituent components of seasoning product 12, the components may be processed in extruder 51 at a temperature below which it causes the components to change their chemical structure. Accordingly, in some examples, seasoning product 12 is formed by extruding the constituent components of the seasoning product at a temperature which does not substantially denature proteins in the product and/or which does not substantially gelatinize ungelatinized starch in the product. The temperature within extruder 51 may be controlled, for example, by externally cooling extruder barrel 62 and/or extruder die 64 and/or adjusting one or more extrusion parameters such as screw speed, screw configuration, total throughput rate, and die opening area.

While the specific temperature at which the constituent components of seasoning product 12 are extruded may vary, in some applications, the components are extruded at a temperature below the boiling point of water. For example, the constituent components of seasoning product 12 may be extruded at a temperature below 200 degrees Fahrenheit (F) (93.3 degrees Celsius) such as, e.g., a temperature below 160 degrees F. (71.1 degrees Celsius), or a temperature below 125 degrees F. (51.7 degrees Celsius). The constituent components may be extruded below any of these foregoing temperatures by maintaining the average temperature of the components below the listed maximum temperature throughout the extrusion process (e.g., from introduction into extruder 51 through discharge out of extruder die 64). In some examples, the constituent components of seasoning product 12 are extruded at a temperature ranging from approximately 30 degrees F. (−1.1 degrees Celsius) to approximately 180 degrees F. (82.2 degrees Celsius) such as, e.g., from 65 degrees F. (18.3 degrees Celsius) to 150 degrees F. (65.6 degrees Celsius), or from 100 degrees F. (37.8 degrees Celsius) to 120 degrees F. (48.9 degrees Celsius).

Pressure within extruder 51 is generally a function of size of the discharge opening(s) and related die opening area defined by extruder die 64 and the compression forces corresponding to different extrusion process parameters such as screw configuration, screw speed, total product throughput, and barrel temperature. Maximum pressure within extruder 51 is typically observed at extruder die 64, where the constituent components of seasoning product 12 are passed through die openings to form the three-dimensional shape of the seasoning product. While increasing the operating pressure within extruder 51 may increase the temperature of the components within the extruder, sufficient pressure may be maintained to ensure that seasoning product 12 is properly compacted and formed by the extruder. In one example, the constituent components of seasoning product 12 are extruded at a die pressure ranging from approximately 50 pounds per square inch (psi) (3.447e+005 newtons/square meter) to approximately 1100 psi (approximately 7.584e+006 newtons/square meter). For example, the constituent components of seasoning product 12 may be extruded at a die pressure ranging from approximately 150 psi (1.034e+006 newtons/square meter) to approximately 800 psi (5.516e+006 newtons/square meter), or a die pressure ranging from approximately 300 psi (2.068e+006 newtons/square meter) to approximately 400 psi (2.758e+006 newtons/square meter).

One way of controlling the pressure within extruder 51 is to control the size of the die opening(s) defined by extruder die 64. Smaller die openings can create more backpressure within extruder 51 than comparatively larger die openings. The size of the die opening(s) defined by extruder die 64 may be dictated by the desired size of seasoning product 12. Further, the size of seasoning product 12 may vary, e.g., based on desired aesthetics of the seasoning product, the amount of seasoning desired to be bound within the seasoning product, and/or the size food item 14 (FIG. 1) with which the seasoning product is to be packaged. In one example, extruder die 64 defines opening(s) ranging in size from approximately 0.2 millimeters (mm) to approximately 5 mm so as to produce a seasoning product 12 having a cross-sectional dimension ranging from approximately 0.2 mm to approximately 5 mm. It should be appreciated that seasoning product 12 can have any size, however, and the disclosure is not limited to a seasoning product defining a particular size.

In general, seasoning product 12 can be formed into any suitable three-dimensional shape. Example shapes include a sphere, a cylinder, a disk, an annulus, and any other known noodle or short pasta shape. Other example shapes include a rectangle, a square, a pyramid, or any other regular or irregular shape. In one example, seasoning product 12 defines the same shape as the shape of a food item 14 (FIG. 1) with which the seasoning product is intended to be packaged. When food item 14 is a pasta noodle having a given shape, for instance, seasoning product may be formed to define the same shape as the pasta noodle.

With further reference to FIG. 2, during operation of extruder 51, rotation of screws 66 may mix together the constituent components of seasoning product 12 introduced into the extruder. The amount of mixing that occurs may depend on the speed and configuration of screws 66 and the composition of the ingredients in the extruder, among other factors. Mixing the constituent components of seasoning product 12 under low shear mixing conditions may help prevent the binder and/or filler components of the seasoning product from being destroyed or substantially decomposed. If the binder and/or filler components of seasoning product 12 are destroyed or substantially decomposed, the seasoning product may not hold its shape during formation, drying, handling, and packaging or may not properly disintegrate during subsequent use.

The amount of shear within extruder 51 can be characterized by the amount of specific mechanical energy input to the constituent components within the extruder during extrusion. The amount of specific mechanical energy input during extrusion may be less than 250 Watts-hour/Kilogram (Wh/kg) such as, e.g., less than 175 Wh/kg, less than 125 Wh/kg, or less than 100 Wh/kg. That being said, sufficient mechanical energy may be input to the components within extruder 51 to ensure thorough mixing of the components to form a shapable dough. For example, the amount of specific mechanical energy input during extrusion may be greater than 15 Wh/kg such as, e.g., greater than 35 Wh/kg, or greater than 50 Wh/kg. In some examples, the amount of specific mechanical energy input during extrusion ranges from approximately 20 Wh/kg to approximately 240 Wh/kg such as, e.g., from 40 Wh/kg to 150 Wh/kg, or from 55 Wh/kg to 75 Wh/kg.

The speed at which screws 66 operate to input a desired amount of mechanical energy into the components in extruder 51 may vary, e.g., based on the size and configuration of the extruder. In one example, screws 66 rotate at a speed ranging from approximately 50 revolutions per minute (rpm) to approximately 450 rpm during operation of extruder 51. For example, screws 66 may rotate at a speed ranging from 65 rpm to 250 rpm, or from 80 rpm to 100 rpm during operation of extruder 51.

To help intermix and extrude the constituent components of seasoning product 12, a consumable processing solvent may be introduced along with other constituent components into extruder 51 during processing. Example processing solvents include water and water-based liquids (e.g., juice, milk), alcohol, and oil. The amount of solvent added to the constituent components may determine how well the components wet, hydrate, and agglomerate as well as how well a shapable, extrudable chunk-free dough, gel, or paste is formed by extruder 51 and how well it can be cut into pieces when exiting the extruder.

When used, the processing solvent may be added to other constituent components of seasoning product 12 (e.g., seasoning, binder, filler) to form an extrudable food seasoning composition that can pass through extruder die 64. In some examples, the processing solvent (e.g., water) is added in an amount sufficient to form an extrudable food seasoning composition that includes greater than 5 weight percent processing moisture such as, e.g., greater than 7 weight percent processing moisture, greater than 10 weight percent processing moisture, greater than 15 weight percent processing moisture, or greater than 25 weight percent processing moisture. The processing moisture may be the combined moisture of any processing solvent added to the constituent components of seasoning product 12 and the moisture inherently (e.g., naturally) present in the components. While the processing solvent may be added to other constituent components of seasoning product 12 in an amount effective to form an extrudable dough, the amount of processing solvent added to the extrudable food seasoning composition may be limited so that the extruded food seasoning product exiting from extruder 51 maintains its extruded three-dimensional shape. Accordingly, in some examples, the processing solvent (e.g., water) is added in an amount sufficient to form an extrudable food seasoning composition that includes less than 50 weight percent processing moisture such as, e.g., less than 40 weight percent processing moisture, less than 30 weight percent processing moisture, or less than 15 weight percent processing moisture. For example, the extrudable food seasoning composition may range from approximately 6 weight percent processing moisture to approximately 40 weight percent processing moisture such as, e.g., from 7 weight percent processing moisture to 25 weight percent processing moisture, or from 8 weight percent processing moisture to 15 weight percent processing moisture. The weight percentage of the processing moisture in the extrudable food seasoning composition may be based on the combined weight of the processing solvent and all the other constituent components of seasoning product 12 (e.g., the weight of the seasoning, binder, filler, and other ingredients).

After the ingredients introduced into extruder 51 are extruded so as to form an extruded food seasoning product, the extruded food seasoning product may be dried to reduce the amount of processing moisture remaining in the product. If food seasoning product 12 contains excess processing moisture such as water, the food seasoning product may become stale and oxidized faster and, as a result, have a reduced shelf life as compared to when the food seasoning product contains comparatively less processing moisture. For these and other reasons, the extruded food seasoning product formed by extruder 51 may be dried after extrusion to form food seasoning product 12.

Any suitable techniques can be used to dry the extruded food seasoning product formed by extruder 51. Example techniques include forced air, belt drying, and fluidized bed drying techniques. In some examples, the extruded food seasoning product is dried at a temperature less than 150 degrees Celsius, such as less than 100 degrees Celsius temperature less than 75 degrees Celsius, or a temperature less than 50 degrees Celsius.

In some examples, the extruded food seasoning product produced by extruder 51 is dried so that food seasoning product 12 contains less than 15 weight percent moisture (e.g., water) in the final product such as, e.g., less than 10 weight percent moisture, less than 7 weight percent moisture, less than 5 weight percent moisture, or less than 3 weight percent moisture. The weight percentage of the moisture in food seasoning product 12 may be based on the combined weight of the moisture (e.g., added processing solvent and inherent moisture) and all the other constituent components in the food seasoning product (e.g., the weight of the seasoning, binder, filler, and other ingredients) when the food seasoning product is initially produced. This is because food seasoning product 12 may absorb moisture over time, which will increase the moisture content in the product as compared to when the product is initially produced.

Although reducing the amount of moisture in seasoning product 12 can reduce the potential for the product to stale or oxidize, if too much moisture is removed from the product, the product may become rancid and/or oxidize faster than if the product contains comparatively more moisture. Accordingly, in some examples, the extruded food seasoning product produced by extruder 51 is dried so that seasoning product 12 still contains at least a minimal amount of moisture such as greater than 0.5 weight percent moisture, greater than 1 weight percent moisture, greater than 2 weight percent moisture, or greater than 3 weight percent moisture.

In examples in which water is used as a processing solvent to produce seasoning product 12, the amount of water introduced into extruder 51 to form an extrudable and cutable composition and subsequently dried out of the extruded composition to form the seasoning product may be controlled to control the shelf life of the seasoning product. Water activity is one parameter that can be used to predict the shelf life of seasoning product 12. Water activity is a parameter that can be used to predict food stability with respect to physical properties and microbial growth rates. Further, the water activity of a food product is typically related to the moisture content in the product. Increasing the amount of moisture in a food product may increase the water activity of the product which, in turn, may reduce the shelf life of the product. Again, however, reducing the moisture content and hence water activity of the food product below a certain threshold may cause the product to become rancid and/or oxidize faster, creating a different shelf life failure mechanism for the food product.

In accordance with the present disclosure, the amount of moisture added and then subsequently removed during formation of seasoning product 12 can be controlled, among other factors, to produce a seasoning product that can absorb more moisture at a given water activity level than the constituent dry ingredients of the same seasoning product. As one example, if the constituent components (e.g., seasoning, binder, filler) of seasoning product 12 were not processed together to form the product but instead were merely mixed together as dry powders, the mixture of powders may only absorb up to 10 weight percent moisture before reaching a given water activity level such as 0.65. On the other hand, if that same combination of dry powders were processed together in accordance with the present disclosure to form seasoning product 12, seasoning product 12 may be able to absorb up to 15 weight percent moisture before reaching the same given water activity level of 0.65. Thus, seasoning product 12 may exhibit hysteresis behavior whereby the relationship between moisture content and water activity for the product does not exhibit the same relationship as that exhibited by the underlying components of the product but instead depends on the manner in which the seasoning product is formed.

Although the specific moisture percentages and water activity levels can vary, for example based on the specific ingredients used in the seasoning product, in some examples, seasoning product 12 can absorb at least 0.25 weight percent more moisture at a given water activity level than the constituent components of the seasoning product can absorb (e.g., were the constituent dry components of the seasoning product exposed to the same environmental conditions as the seasoning product but not processed together to form the seasoning product). In different examples, seasoning product 12 can absorb at least 0.5 weight percent more moisture at a given water activity level than the constituent components of the seasoning product can absorb at the same given water activity level, such as at least 1 weight percent more moisture, at least 2 weight percent more moisture, from approximately 0.1 weight percent to approximately 2.5 weight percent more moisture, or from approximately 0.25 weight percent to approximately 2 weight percent more moisture. The given water activity level may be any water activity level, such as a water activity level between 0.2 and 0.6, a water activity level of 0.4, a water activity level of 0.5, or the like.

Without being bound by any particular theory, in some examples, seasoning product 12 may exhibit a lower water activity and increased shelf-life than the corresponding constituent components incorporated into the product by undergoing a crystalline structure change during processing. For example, before being incorporated into seasoning product 12, at least a portion of the constituent components (e.g., at least a portion of the seasoning, binder, and/or filler) may exhibit a crystalline structure. The crystalline structure may be characterized by exhibiting an ordered, repeating arrangement of atoms and/or molecules. During processing (e.g., in which the constituent components are processed together in extruder 51), the components may undergo a structural transformation in which the components lose their crystalline structure so that seasoning product 12 exhibits a non-crystalline or amorphous structure. The non-crystalline or amorphous structure may be characterized as lacking an ordered, repeating arrangement of atoms and/or molecules over the bulk of the product.

Figure 3:
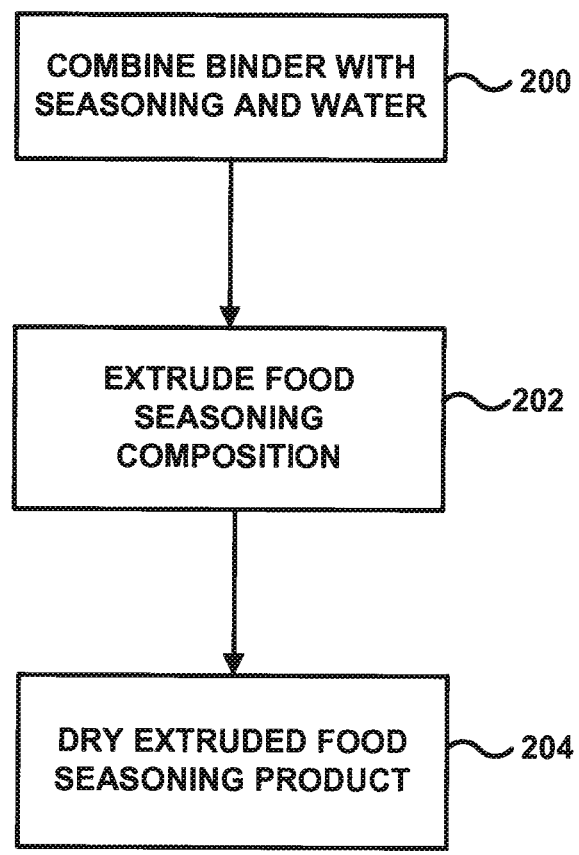
FIG. 3 is a flow diagram illustrating an example technique that may be used to form the food seasoning product of FIG. 1.

Different seasoning product compositions and seasoning product formation techniques have been described in relation to FIGS. 1 and 2. FIG. 3 is a flow diagram illustrating an example method for forming a food seasoning product that contains seasoning bound together with an edible binder to form a three-dimensional shape. For ease of description, the method of FIG. 3 is described in accordance with seasoning product 12 (FIG. 1) and extruder system 50 (FIG. 2). In other examples, however, the method of FIG. 3 can be executed using different compositions or with apparatuses having different configurations, as described herein.

As shown in FIG. 3, the example technique includes combining a binder material configured to hold seasoning product 12 together to define a three-dimensional shape with seasoning and water to form an extrudable food seasoning composition (200). The seasoning may be an ingredient or combination of ingredients that function to modify or enhance the flavor and taste of another food item with which the seasoning is combined, such as an herb, spice, sweetener, or flavorings. The binder may be an ingredient or combination of ingredients that function to bind the seasoning together so that the seasoning can be extruded into a three-dimensional shape and then dried to hold the three-dimensional shape. Example binders can include pre-gelatinized starches, proteins, gums, and hydrocolloids. In some examples, a filler material is combined with the binder material and the seasoning to form the extrudable food seasoning composition (200). The filler material may provide a discontinuous phase in seasoning product 12 within a continuous phase defined by the binder and seasoning. The discontinuous phase may help seasoning product 12 disintegrate and lose its three-dimensional shape upon exposure to liquid water, e.g., during a cooking process when water is deliberately added to the seasoning product.

In one example, binder is combined with seasoning and water to form an extrudable food seasoning composition that includes (or, optionally, consists or consists essentially of) greater than 20 weight percent seasoning, greater than 5 weight percent binder, and greater than 5 weight percent water. For example, the extrudable food seasoning composition may include greater than 40 weight percent seasoning, greater than 10 weight percent binder, and greater than 7 weight percent water. In accordance with these examples, filler may form greater than 15 weight percent of the extrudable food seasoning composition, such as greater than 20 weight percent of the extrudable food seasoning composition.

In another example, binder is combined with seasoning and water to form an extrudable food seasoning composition that includes (or, optionally, consists or consists essentially of) from approximately 5 weight percent to approximately 40 weight percent binder, from approximately 10 weight percent to approximately 85 weight percent seasoning, and from approximately 5 weight percent to approximately 40 weight percent water. For example, the extrudable food seasoning composition may include from approximately 5 weight percent to approximately 15 weight percent binder, from approximately 20 weight percent to approximately 80 weight percent seasoning, and from approximately 7 weight percent to approximately 25 weight percent water. In accordance with these examples, filler may form from approximately 10 weight percent to approximately 40 weight percent of the extrudable food seasoning composition, such as from approximately 15 weight percent to approximately 25 weight percent of the extrudable food seasoning composition.

The example technique of FIG. 3 also includes extruding the extrudable food seasoning composition into a three-dimensional shape to produce an extruded food seasoning composition (202). The constituent components of the extrudable food seasoning composition can be combined (200) within extruder 51 or can be combined prior to introducing the components into the extruder. Regardless, within extruder 51, screws 66 may mix the constituent components of the extrudable food seasoning composition together and discharge the composition under pressure through extruder die 64 so as to form the extruded and compacted food seasoning composition.

In one example, the extrudable food seasoning composition is extruded at a temperature ranging from approximately 50 degrees F. (10 degrees Celsius) to approximately 180 degrees F. (82.2 degrees Celsius) and a die pressure ranging from approximately 50 psi (3.447e+005 newtons/square meter) to approximately 1100 psi (7.584e+006 newtons/square meter) to produce the extruded food seasoning composition. For example, the extrudable food seasoning composition is extruded at a temperature ranging from approximately 65 degrees F. (18.3 degrees Celsius) to approximately 150 degrees F. (65.6 degrees Celsius) and a die pressure ranging from approximately 150 psi (1.034e+006 newtons/square meter) to approximately 800 psi (5.516e+006 newtons/square meter) to produce the extruded food seasoning composition. In accordance with these examples, the amount of mechanical energy input into the extrudable food seasoning composition by extruder 51 to produce the extruded food seasoning composition may range from approximately 25 Wh/kg to approximately 250 Wh/kg, such as from approximately 40 Wh/kg to approximately 150 Wh/kg.

During extrusion (202), the extrudable food seasoning composition may undergo a crystalline structure transformation (e.g., due to hydration and heat) whereby a portion (e.g., all) of the extrudable food seasoning composition is converted from a crystalline structure to an amorphous structure. For example, by controlling the temperature and pressure of extruder 51 and/or the amount of water in the extrudable food seasoning composition, among other factors, any crystalline structure exhibited by the extrudable food seasoning composition may be converted to a non-crystalline structure. When this occurs, the extruded food seasoning composition produced by extruder 51 can exhibit a different crystalline structure than the constituent components of the extrudable food seasoning composition introduced into the extruder.

Independent of whether the extrudable food seasoning composition undergoes a crystalline structure transformation during extrusion, the extruded food seasoning composition produced by extrusion is dried in the example technique of FIG. 3 (204). Drying the extruded food seasoning composition may remove water that was added to the extrudable food seasoning composition, e.g., to increase the flowability of the extrudable food seasoning composition and promote transformation of the crystalline structure of the composition during extrusion. Depending on the application, the extruded food seasoning composition may be dried so as to produce seasoning product 12 exhibit less than 10 weight percent moisture, such as less than 7 weight percent moisture or less than 5 weight percent moisture. For example, the extruded food seasoning composition may be dried so as to produce seasoning product 12 exhibiting a moisture content ranging from approximately 2 weight percent to approximately 9 weight percent, such as from approximately 4 weight percent to approximately 7 weight percent.

Subsequent to producing seasoning product 12, the seasoning product may be packaged with or without another food item and distributed to consumers for use. During use, a consumer may open a package containing seasoning product 12 and add liquid water to the seasoning product, for example, in a cooking container. Seasoning product 12 may disintegrate into its constituent components upon contact with the liquid water, releasing seasoning bound within the product to its unbound state. Depending on the composition of seasoning product 12, heat and/or mechanical agitation supplied through hand mixing may be applied to the seasoning product to help the seasoning product fully disintegrate.

The following examples may provide additional details about a food seasoning product formed in accordance with this disclosure.

Example

Two seasoning compositions were prepared that each had the following components:

| Description | Ingredient Function | WT % |
|---|---|---|
| STARCH CORN | Filler | 36 |
| WHEAT FLOUR | Binder/Filler | 17 |
| MALTODEXTRIN | Binder | 2 |
| Flavor Ingredients | Flavor/Spices | 45 |
| Total | | 100 |

The constituent components of the first seasoning composition were not hydrated, compacted, and bound into a three-dimensional seasoning product but were instead simply combined together as loose particulate powder. The second seasoning composition was formed into a three-dimensional seasoning product according to the disclosure. In particular, the constituent components of the seasoning composition were combined with water to yield an extrudable food seasoning composition having 11 weight percent processing moisture. The extrudable food seasoning composition was then extruded at a barrel temperature of 35 degrees Celsius and a die pressure of 350-450 psi to yield an extruded food seasoning composition. The extruded food seasoning composition was then dried to provide the three-dimensional seasoning product having approximately 3 weight percent moisture after drying.

Moisture isotherms were generated for the two seasoning compositions. The first seasoning composition that was not bound into the three dimensional food seasoning product and the second seasoning composition that was processed into the three dimensional food seasoning product were both exposed to identical environmental conditions while generating the moisture isotherms.

Figure 4:
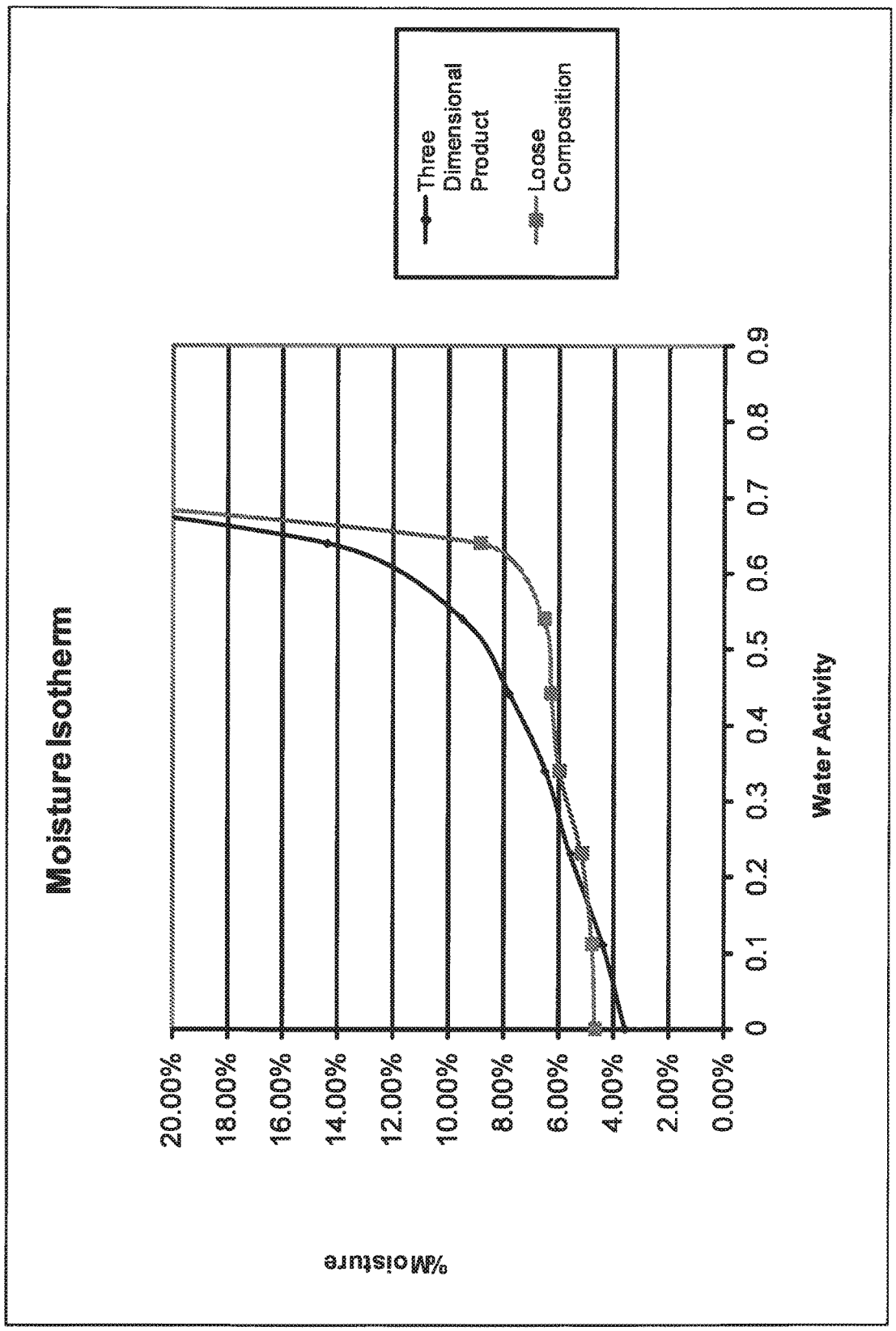
FIG. 4 is a plot showing example moisture versus water activity data for example seasoning compositions.

FIG. 4 is a plot showing moisture isotherms for the two seasoning compositions. The y-axis of the plot is the weight percent moisture of each seasoning composition. The x-axis of the plot is the water activity of each seasoning composition. The plot shows that the seasoning composition processed into the three dimensional food seasoning product could absorb more moisture at a given level of water activity than the seasoning composition that was not processed into the seasoning product.

The invention claimed is:

1. A food kit comprising:
   a food item;
   a shaped food seasoning product that defines a three-dimensional shape, wherein the shaped food seasoning product comprises a binder material, including at least one of a flour, a protein, a hydrocolloid, a gum, and an uncooked, pre-gelatinized starch, binding the shaped food seasoning product together to define the three-dimensional shape, a filler material configured to cause the shaped food seasoning product to disintegrate and lose the three-dimensional shape upon exposure to water, and seasoning, the seasoning comprises greater than 20 weight percent of the shaped food seasoning product, and the food item and shaped food seasoning product are distinct from one another; and
   a container,
   wherein the container encloses the food item and the shaped food seasoning product so that the food item and the shaped food seasoning product are contained inside the container, the container includes a first wall and a second wall, and each of the first wall and the second wall is formed from a material exhibiting a water vapor transfer rate of greater than 0.05 grams/100 square inches/day.

2. The food kit of claim 1, wherein the container encloses the food item and the shaped food seasoning product so that the food item is in contact with the shaped food seasoning product inside the container.

3. The food kit of claim 1, wherein the food item comprises at least one of a fruit, a meat, a vegetable, and a grain.

4. The food kit of claim 1, wherein the filler material comprises at least one of an uncooked, ungelatinized starch, a flour, a plant fiber, and an inorganic filler.

5. The food kit of claim 1, wherein the seasoning comprises at least one of an herb, a spice, a sweetener, a dairy-based flavoring, a meat-based flavoring, and a vegetable-based flavoring.

6. The food kit of claim 5, wherein the seasoning comprises at least one of garlic, onion, ginger, chili powder, oregano, sage, dill weed, basil, fennel, mustard seed, lemon powder, nutmeg, cumin, rosemary, thyme, parsley, paprika, salt, sugar, pepper, dried vegetable particulate, cheese flavoring, sour cream flavoring, mushroom flavoring, tomato flavoring, beef flavoring, and chicken flavoring.

7. The food kit of claim 1, wherein the shaped food seasoning product comprises from approximately 5 weight percent to approximately 25 weight percent binder material, from approximately 15 weight percent to approximately 35 weight filler material, from approximately 40 weight percent to approximately 80 weight percent seasoning, and from approximately 3 weight percent to approximately 10 weight percent water.

8. The food kit of claim 1, wherein:
the shaped food seasoning product is one of a plurality of shaped food seasoning products, each defining a three-dimensional shape;
each shaped food seasoning product comprises a binder material, binding the shaped food seasoning product together to define the three-dimensional shape, and seasoning, the seasoning comprising greater than 20 weight percent of the shaped food seasoning product; and
the container encloses the food item and the plurality of shaped food seasoning products so that the food item and the plurality of shaped food seasoning products are contained inside the container.

9. The food kit of claim 1, wherein the material exhibits a water vapor transfer rate of greater than 0.1 grams/100 square inches/day.

10. The food kit of claim 1, wherein the first wall is a sidewall of the container.

11. A method comprising:
mixing a binder material configured to hold a shaped food seasoning product together to define a three-dimensional shape, seasoning to form an extrudable food seasoning composition, wherein the seasoning comprises greater than 20 weight percent of the extrudable food seasoning composition, and a filler material configured to cause the shaped food seasoning product to disintegrate and lose the three-dimensional shape upon exposure to water with the binder material;
extruding the extrudable food seasoning composition to form a shaped food seasoning product defining the three-dimensional shape;
subsequent to extruding the extrudable food seasoning composition to form the shaped food seasoning product, drying the shaped food seasoning product until the shaped food seasoning product exhibits less than approximately 7 weight percent moisture; and
packaging the shaped food seasoning product with a food item in a container so that the food item is in contact with the shaped food seasoning product inside the container, wherein the container includes a first wall and a second wall, and each of the first wall and the second wall is formed from a material exhibiting a water vapor transfer rate of greater than 0.05 grams/100 square inches/day.

12. The method of claim 11, wherein the binder material comprises at least one of a flour, a protein, a hydrocolloid, and a gum; the filler material comprises at least one of an uncooked, ungelatinized starch, the flour, a plant fiber, and an inorganic filler; and the seasoning comprises at least one of an herb, a spice, a sweetener, a dairy-based flavoring, a meat-based flavoring, and a vegetable-based flavoring.

13. The method of claim 12, wherein mixing the binder material, the filler material, and the seasoning comprises mixing the binder material, the filler material, and the seasoning so that the shaped food seasoning product comprises from approximately 5 weight percent to approximately 25 weight percent binder, from approximately 15 weight percent to approximately 35 weight filler, and from approximately 40 weight percent to approximately 95 weight percent seasoning.

14. The method of claim 12, wherein mixing the binder material, the filler material, and the seasoning to form the extrudable food seasoning composition comprises mixing water with the binder material, the filler material, and the seasoning to form the extrudable food seasoning composition, the extrudable food seasoning composition comprising from approximately 7 weight percent moisture to approximately 25 weight percent moisture.

15. The method of claim 11, wherein extruding the extrudable food seasoning composition to form the shaped food seasoning product comprises cold extruding the extrudable food seasoning composition so that shaped food seasoning product does not exceed a temperature of approximately 150 degrees Fahrenheit during extrusion.

16. The method of claim 11, wherein:
extruding the extrudable food seasoning composition includes extruding the extrudable food seasoning composition to form a plurality of shaped food seasoning products, each defining a three-dimensional shape; and
packaging the shaped food seasoning product includes packaging the plurality of shaped food seasoning products with the food item in the container so that the food item is in contact with the plurality of shaped food seasoning products inside the container.

17. The method of claim 11, wherein the first wall is a sidewall of the container.

18. A method comprising:
opening a container that includes a food item and a shaped food seasoning product that is in contact with the food item inside of the container, wherein the shaped food seasoning product comprises a binder material binding the shaped food seasoning product together to define a three-dimensional shape and seasoning, the seasoning comprises greater than 20 weight percent of the shaped food seasoning product, the container includes a first wall and a second wall, and each of the first wall and the second wall is formed from a material exhibiting a water vapor transfer rate of greater than 0.05 grams/100 square inches/day; and
adding water to the food item and the shaped food seasoning product and thereby disintegrating the shaped food seasoning product.

19. The method of claim 18, further comprising heating the food item, the shaped food seasoning product, and the water.

20. The method of claim 18, wherein the shaped food seasoning product further comprises a filler material configured to cause the shaped food seasoning product to disintegrate and lose the three-dimensional shape upon exposure to water.

21. The method of claim 18, wherein:
opening the container includes opening the container that includes the food item and a plurality of shaped food seasoning products that is in contact with the food item inside of the container;
each of the plurality of shaped food seasoning products comprises a binder material, binding the shaped food seasoning product together to define a three-dimensional shape, and seasoning, the seasoning comprising greater than 20 weight percent of the shaped food seasoning product; and adding the water includes adding the water to the food item and the plurality of shaped food seasoning products and thereby disintegrating the plurality of shaped food seasoning products.

22. The method of claim 18, wherein the first wall is a sidewall of the container.

* * * * *